(12) United States Patent
Horie et al.

(10) Patent No.: US 11,214,748 B2
(45) Date of Patent: Jan. 4, 2022

(54) LUBRICANT MATERIAL FOR ASSISTING MACHINING PROCESS, LUBRICANT SHEET FOR ASSISTING MACHINING PROCESS, AND MACHINING METHOD USING THE SAME

(71) Applicant: Mitsubishi Gas Chemical Company, Inc., Tokyo (JP)

(72) Inventors: Shigeru Horie, Tokyo (JP); Yousuke Matsuyama, Yonezawa (JP); Kazuhiro Nakamura, Yonezawa (JP); Kenji Ishikura, Yonezawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 5 days.

(21) Appl. No.: 16/607,265

(22) PCT Filed: Apr. 20, 2018

(86) PCT No.: PCT/JP2018/016291
§ 371 (c)(1),
(2) Date: Oct. 22, 2019

(87) PCT Pub. No.: WO2018/198965
PCT Pub. Date: Nov. 1, 2018

(65) Prior Publication Data
US 2020/0299601 A1 Sep. 24, 2020

(30) Foreign Application Priority Data

Apr. 25, 2017 (JP) .............................. JP2017-085817

(51) Int. Cl.
| | |
|---|---|
| *C10M 103/02* | (2006.01) |
| *C10M 107/34* | (2006.01) |
| *C10M 107/42* | (2006.01) |
| *C10M 107/44* | (2006.01) |
| *C10M 111/04* | (2006.01) |
| C10N 40/20 | (2006.01) |
| C10N 50/00 | (2006.01) |
| C10N 20/00 | (2006.01) |
| C10N 20/04 | (2006.01) |
| C10N 40/22 | (2006.01) |

(52) U.S. Cl.
CPC ........ *C10M 103/02* (2013.01); *C10M 107/34* (2013.01); *C10M 107/42* (2013.01); *C10M 107/44* (2013.01); *C10M 111/04* (2013.01); C10M 2201/0413 (2013.01); C10M 2209/003 (2013.01); C10M 2217/003 (2013.01); C10N 2020/04 (2013.01); C10N 2020/091 (2020.05); C10N 2040/22 (2013.01); C10N 2040/245 (2020.05); C10N 2040/247 (2020.05); C10N 2050/025 (2020.05)

(58) Field of Classification Search
CPC .............. C10M 103/02; C10M 107/34; C10M 107/42; C10M 107/44; C10M 111/04; C10M 2209/1045; C10M 2209/1055; C10M 2209/1075; C10M 2201/0413; C10M 2209/003; C10M 2217/003; C10M 169/044; C10M 2207/024; C10M 2209/109; C10M 2207/127; C10M 2209/104; C10M 2207/125; C10M 2201/041; C10M 2209/0845; C10N 2040/247; C10N 2050/025; C10N 2020/091; C10N 2040/245; C10N 2020/04; C10N 2040/22; C10N 2020/06; C09J 2301/41; C09J 7/22; C09J 2471/006; C09J 2433/00; C08K 3/045; B23B 2222/88; B23B 2250/12; B23B 2222/80; B23B 2222/04; B23B 2226/275; B23B 2226/27; B23B 35/00

See application file for complete search history.

(56) References Cited

U.S. PATENT DOCUMENTS

| | | | | |
|---|---|---|---|---|
| 4,252,658 A | * | 2/1981 | Tasaka | ................ C10M 111/04 508/131 |
| 9,211,592 B2 | | 12/2015 | Ikeguchi et al. | |
| 2007/0298989 A1 | * | 12/2007 | Poirier | ................ C10M 111/02 508/580 |
| 2012/0184474 A1 | * | 7/2012 | Kawata | .................. C07C 69/40 508/497 |
| 2015/0111049 A1 | * | 4/2015 | Matsuyama | ......... C10M 171/00 428/464 |
| 2018/0229339 A1 | | 8/2018 | Matsuyama et al. | |

FOREIGN PATENT DOCUMENTS

| | | | | |
|---|---|---|---|---|
| CN | 103396865 A | * | 11/2013 | |
| CN | 106090001 A | | 11/2016 | |
| JP | 2004-331737 A | | 11/2004 | |
| JP | 2007-314621 A | | 12/2007 | |
| JP | 2009-173814 A | | 8/2009 | |
| JP | 2009173814 A | * | 8/2009 | |
| JP | 2012-210689 A | | 11/2012 | |
| JP | 2015-129219 A | | 7/2015 | |
| TW | 201711791 A | | 4/2017 | |
| WO | WO-2014084171 A1 | * | 6/2014 | .......... C10M 173/02 |
| WO | 2017/022822 A1 | | 2/2017 | |

OTHER PUBLICATIONS

International Search Report for PCT/JP2018/016291, dated Jun. 12, 2018, and English Translation submitted herewith (5 pages).

* cited by examiner

*Primary Examiner* — Taiwo Oladapo
(74) *Attorney, Agent, or Firm* — Fitch, Even, Tabin & Flannery LLP

(57) ABSTRACT

A lubricant material for assisting machining process comprising fullerene.

12 Claims, No Drawings

LUBRICANT MATERIAL FOR ASSISTING MACHINING PROCESS, LUBRICANT SHEET FOR ASSISTING MACHINING PROCESS, AND MACHINING METHOD USING THE SAME

CROSS-REFERENCE TO RELATED APPLICATIONS

This application is a U.S. national phase application filed under 35 U.S.C. § 371 of International Application Number PCT/JP2018/016291, filed Apr. 20, 2018, designating the United States, which claims priority from Japanese Application Number 2017-085817, filed Apr. 25, 2017.

FIELD OF THE INVENTION

The present invention relates to a lubricant material for assisting machining process, a lubricant sheet for assisting machining process, and a machining method using the same.

BACKGROUND OF THE INVENTION

High-strength materials such as metals or alloys including titanium alloy, fiber-reinforced plastics (FRP), and ceramic are industrially essential materials. However, the machining work of such materials for obtaining desired shapes is more difficult as their strength is higher. In addition, tools for use in the processing are expensive and have a short lifespan. Examples of the high-strength material most versatile as a structure material for aircrafts include aluminum alloy. Titanium alloy, as compared with aluminum alloy, has large breaking strength in spite of its density, has high corrosion resistance, and can have a lighter weight by combination with carbon fiber-reinforced plastic (CFRP). Therefore, the proportion of titanium alloy in structure materials for aircrafts is on the increase.

However, titanium alloy is very difficult to weld, and CFRP is not weldable. Therefore, members using these materials are generally joined using fastening elements such as rivets. For this purpose, a high grade of hole processing using a machining tool such as a drill is demanded. Furthermore, nickel-based alloy such as Inconel™ or Waspaloy™ is used at sites required to particularly have heat resistance, such as aircraft engines. Aircraft engine components often have a complicated shape, for which machining work is essential.

All the alloys as described above generate a large quantity of heat at the time of machining work and have a lower thermal conductivity than that of general metals. Therefore, the machining heat concentrates easily on tools. Hence, the machining work of such alloys causes considerable abrasion of machining tools due to high material strength as workpiece materials and the machining heat. Such machining heat and tool abrasion reduce dimension accuracy, machining surface roughness, and the grade of processing in terms of the occurrence of burrs. Although machining heat generated from CFRP at the time of machining work is smaller than that from the alloys, carbon fiber remains without being cut due to blunted machining tools ascribable to abrasion so that fluffs occur in machining portions, reducing the grade of processing. High-strength materials and composite materials comprising these materials are referred to as "difficult-to-cut materials".

Some techniques for obtaining high-quality holes, for example, in drilling work have already been proposed as machining methods for the difficult-to-cut materials mentioned above. Examples thereof include methods which involve gradually changing the shape of a tool, for example, the curvature of a machining face or the point angle of a drill (see, for example, Patent Literature 1).

CITATION LIST

Patent Literature

Patent Literature 1: Japanese Patent Laid-Open No. 2012-210689
Patent Literature 2: International Publication No. WO 2017-022822

SUMMARY OF INVENTION

Among machining work techniques for metals or fiber-reinforced plastics, drilling work most generally employs a drill. In the case of particularly requiring a high grade of dimension accuracy or machining surface roughness, finishing work is carried out using a reamer or boring. Also, in order to remove burrs or fluffs on the drill entrance side or exit side that have occurred by processing with a drill, finishing work is carried out using a burring tool such as a chamfering cutter. Among the difficult-to-cut materials, metal materials place large workload on the removal of burrs, particularly, when burrs on the drill exit side have a large height. For fiber-reinforced plastics, repair is very difficult when delamination occurs on the drill exit side. For decreasing such workload in finishing work, processing quality at the stage of prepared hole drilling work or crude processing is important.

In the machining work of difficult-to-cut materials, the quality problems of machining surfaces arise more easily as the abrasion of machining tools proceeds to increase machining resistance. As measures against this problem, tool exchange is accelerated in order to maintain processing quality. However, the ratio of tool cost to processing cost is high under the circumstances.

Conventional processing methods generally employ a machining fluid at the time of the machining work of difficult-to-cut metals. The machining fluid is mainly aimed at cooling machining portions and conferring lubricity and is supplied from an oil hole disposed in an upper processing surface or a tool. Use of the machining fluid can reduce, to some extent, burrs that occur on the drill exit side. The machining fluid may be oil-based or may be water-soluble. The former machining fluid is particularly excellent in lubrication performance, while the latter one is excellent in cooling performance. The water-soluble machining fluid is often used in the processing of difficult-to-cut metals, which often generates unfavorable machining heat at the time of machining work.

The water-soluble machining fluid includes, for example, soluble type using an aqueous solution of a water-soluble lubricating component, and emulsion type using an emulsified dispersion of an oil-based lubricating component, both of which however place large load on human bodies and the environment, disadvantageously leading to deteriorated working environments or waste liquids. Furthermore, due to unfavorable scattering, a setting where the machining fluid sufficiently exerts its performance is limited to machine tools capable of processing in closed systems such as machining centers. Hence, the machining fluid merely exhibits limited activity at the site of assembly of aircraft components or automobile components. In addition, in the case of using a difficult-to-cut metal and a fiber-reinforced plastic in combination, the machining fluid is used in a restricted manner because the attachment of the machining fluid to the fiber-reinforced plastic is undesirable.

The present inventors have found that a water-soluble resin composition supplemented with a solid lubricating material is molded into a sheet, which is then disposed on the drill entrance side or exit side of a difficult-to-cut material serving as a workpiece material so that the components of the sheet are transferred to the drill edge to produce a lubricating effect and a tool edge-protecting effect (see Patent Literature 2). However, there still exists room for improvement in the suppression of burrs that occur upon drilling of difficult-to-cut metals or fluffs that occur upon drilling of fiber-reinforced plastics.

The present invention has been made in light of the problems described above. An object of the present invention is to provide a lubricant material for assisting machining process that can reduce burrs and chippings that occur at the end portion of a machining surface, or uncut fiber residues and delamination that occur at the end portion of a machining surface of a fiber-reinforced plastic as a difficult-to-cut material, in the machining work, particularly, through-hole drilling work, of a difficult-to-cut material, and to provide a lubricant sheet for assisting machining process comprising the lubricant material for assisting machining process, and a machining method using the lubricant material for assisting machining process or the lubricant sheet for assisting machining process.

The present inventors have conducted diligent studies to attain the object. As a result, the present inventors have completed the present invention by finding that the object can be attained by the addition of fullerene.

Specifically, the present invention is as follows.

[1]

A lubricant material for assisting machining process comprising a fullerene.

[2]

The lubricant material for assisting machining process according to [1], wherein
the fullerene comprises $C_{60}$.

[3]

The lubricant material for assisting machining process according to [1] or [2], further comprising
a carbon (C).

[4]

The lubricant material for assisting machining process according to any one of [1] to [3], further comprising:
a high molecular weight compound (A) having a weight average molecular weight of $5 \times 10^4$ or larger and $1 \times 10^6$ or smaller; and
a medium molecular weight compound (B) having a weight average molecular weight of $1 \times 10^3$ or larger and $2 \times 10^4$ or smaller.

[5]

The lubricant material for assisting machining process according to [4], wherein
the high molecular weight compound (A) comprises a thermoplastic resin having the weight average molecular weight of $5 \times 10^4$ or larger and $1 \times 10^6$ or smaller, and
the medium molecular weight compound (B) comprises a thermoplastic resin having the weight average molecular weight of $1 \times 10^3$ or larger and $2 \times 10^4$ or smaller.

[6]

The lubricant material for assisting machining process according to [4] or [5], wherein
the high molecular weight compound (A) comprises a water-soluble thermoplastic resin and/or a water-insoluble thermoplastic resin, wherein
the water-soluble thermoplastic resin comprises one or more selected from the group consisting of polyalkylene oxide, polyalkylene glycol, an ester compound of polyalkylene glycol, an ether compound of polyalkylene glycol, water-soluble urethane, a polyether-based water-soluble resin, water-soluble polyester, sodium poly(meth)acrylate, polyacrylamide, polyvinylpyrrolidone, polyvinyl alcohol, an ether compound of cellulose, an ester compound of cellulose, and modified polyamide, and
the water-insoluble thermoplastic resin comprises one or more selected from the group consisting of a urethane-based polymer, an acrylic-based polymer, a vinyl acetate-based polymer, a vinyl chloride-based polymer, a polyester-based polymer, a polyolefin-based polymer, a polystyrene-based resin, and copolymers thereof.

[7]

The lubricant material for assisting machining process according to any one of [4] to [6], wherein
the medium molecular weight compound (B) comprises a water-soluble thermoplastic resin and/or a water-insoluble thermoplastic resin, wherein
the water-soluble thermoplastic resin comprises one or more selected from the group consisting of polyalkylene glycol, a monoether compound of polyalkylene oxide, a monostearate compound of polyalkylene oxide, and polyalkylene oxide.

[8]

The lubricant material for assisting machining process according to any one of [4] to [7], wherein
a content of the fullerene is 0.1 to 30 parts by mass based on 100 parts by mass in total of the fullerene, the high molecular weight compound (A), the medium molecular weight compound (B), and the carbon (C).

[9]

A lubricant sheet for assisting machining process, the sheet being at least partially provided with a layer made of a lubricant material for assisting machining process according to any one of [1] to [8].

[10]

The lubricant sheet for assisting machining process according to [9], the sheet being at least partially provided with an adhesive layer.

[11]

The lubricant sheet for assisting machining process according to [10], wherein
the adhesive layer comprises an acrylic-based polymer.

[12]

The lubricant sheet for assisting machining process according to any one of [9] to [11], wherein
a thickness of the layer made of the lubricant material for assisting machining process is 0.1 to 20 mm.

[13]

A machining method comprising
a machining step of machining a workpiece material with a machining tool while bringing a lubricant material for assisting machining process according to any one of [1] to [12] into contact with the machining tool and/or a to-be-processed portion of the workpiece material.

[14]

The machining method according to [13], wherein
in the machining step, a through-hole is formed by machining.

[15]
The machining method according to [13] or [14], wherein the workpiece material is one or more selected from the group consisting of titanium alloy, aluminum alloy, super-alloy, stainless steel, carbon fiber-reinforced plastic, aramide fiber-reinforced plastic, and composite materials comprising these.

The present invention can provide a lubricant material for assisting machining process that can reduce burrs and chippings that occur at the end portion of a machining surface, or uncut fiber residues and delamination that occur at the end portion of a machining surface of a fiber-reinforced plastic as a difficult-to-cut material, in the machining work, particularly, through-hole drilling work, of a difficult-to-cut material, and can provide a lubricant sheet for assisting machining process comprising the lubricant material for assisting machining process, and a machining method using the lubricant material for assisting machining process or the lubricant sheet for assisting machining process.

DESCRIPTION OF EMBODIMENTS

Hereinafter, the mode for carrying out the present invention (hereinafter, referred to as the "present embodiment") will be described in detail. However, the present invention is not limited by this embodiment, and various changes or modifications can be made therein without departing from the spirit of the present invention.

[Lubricant Material for Assisting Machining Process]

The lubricant material for assisting machining process of the present embodiment is not particularly limited as long as the lubricant material for assisting machining process contains fullerene. Examples thereof include lubricant material for assisting machining process comprising a polymeric material and an inorganic filler. Specifically, a lubricant material for assisting machining process containing fullerene, a polymeric material such as a water-soluble or water-insoluble thermoplastic resin or thermosetting resin, and an inorganic filler such as carbon, molybdenum disulfide, tungsten disulfide, or a molybdenum compound is preferred, and a lubricant material for assisting machining process containing fullerene, a high molecular weight compound (A) having a weight average molecular weight of $5 \times 10^4$ or larger and $1 \times 10^6$ or smaller, a medium molecular weight compound (B) having a weight average molecular weight of $1 \times 10^3$ or larger and $5 \times 10^4$ or smaller, and carbon (C) is more preferred. Use of such a lubricant material for assisting machining process tends to be able to further reduce load on a machining tool and to be able to further reduce burrs, chippings, uncut fiber residues, and delamination that occur at the end portion of a machining surface.

Examples of the shape of the lubricant material for assisting machining process include, but are not particularly limited to, sheet-shaped lubricant material for assisting machining process, lubricant material for assisting machining process in a block form such as a round bar shape or a square bar shape, and lubricant material for assisting machining process in a melted state. Among them, a sheet form is preferred.

The lubricant material for assisting machining process may be a single layer comprising a fullerene, a polymeric material, and an inorganic filler or may be a laminate having a layer comprising a fullerene, a polymeric material, and an inorganic filler, and an additional layer. Examples of the additional layer include an adhesive layer for improving the adhesion between the lubricant material for assisting machining process and a workpiece material, and a protective layer for preventing scratches on the surface of the lubricant material for assisting machining process. Hereinafter, the configuration of the lubricant material for assisting machining process will be described.

(Fullerene)

The lubricant material for assisting machining process of the present embodiment comprises fullerene. As the fullerene, most general $C_{60}$, $C_{70}$, $C_{72}$ and fullerene constituted by more carbon atoms, and a mixture thereof can be used. Among these fullerenes, a fullerene structurally closer to a sphere is preferably used, and $C_{60}$ is most preferred. Chemically unmodified fullerenes as well as fullerenes chemically modified with a functional group that causes neither corrosion nor other degradations in a workpiece can be used. Examples of such a functional group include, but are not limited to, an alkyl group, an alkenyl group, an alkoxy group, a hydroxy group, an acyl group, a phenyl group, a benzyl group, a carboxyl group, and a carboxylic acid ester group.

The fullerene may be in a powder form, or granules, slurry with water or an organic solvent, or a compound obtained by kneading with a resin can be used.

Use of the fullerene tends to suppress burrs while decreasing frictional heat at the time of machining work. Although the reason therefor is not particularly limited, this is presumably because the fullerene, which has a structure closed in a spherical shell form by the entrance of the 5-membered rings into the carbon atom network of the 6-membered rings, reduces a coefficient of friction and functions as a solid lubricant. Likewise, lubricity brought about by the fullerene presumably also suppresses chippings, uncut fiber residues, or delamination. In the present embodiment, the fullerene is excluded from the carbon (C) mentioned later.

The secondary average particle size of the fullerene is not particularly limited and is preferably 1 mm or smaller, more preferably 100 μm or smaller, further preferably 50 μm or smaller. When the secondary average particle size of the fullerene falls within the range described above, the dispersibility of the fullerene in the lubricant material for assisting machining process tends to be further improved. Also, fullerene variously coated for the purpose of, for example, improving its dispersibility can be used.

In the present embodiment, the average particle size of the fullerene or the carbon (C) refers to a median size. The median size means a particle diameter that is obtained from the cumulative distribution curve (number-based) of particle sizes and becomes 50% height in the curve (D50 value), and can be measured by, for example, a method described in Examples.

The content of the fullerene in the lubricant material for assisting machining process according to the present embodiment is preferably 0.1 to 30 parts by mass, more preferably 1 to 25 parts by mass, further preferably 15 to 20 parts by mass, based on 100 parts by mass in total of the fullerene, the high molecular weight compound (A) mentioned later, the medium molecular weight compound (B) mentioned later, and the carbon (C) mentioned later. When the content of the fullerene in the lubricant material for assisting machining process falls within the range described above, the resulting lubricant material for assisting machining process tends to more effectively exert its lubricating effect at the time of machining work and to improve processing quality for a workpiece material.

(High Molecular Weight Compound (A))

The high molecular weight compound (A) can function as a lubricant and is capable of exerting effects of improving the lubricity of the lubricant material for assisting machining process and reducing burrs, chippings, uncut fiber residues, and delamination that occur at the end portion of a machining surface. Furthermore, the high molecular weight compound (A) can also function as a molding agent and is capable of exerting effects of improving the moldability of the lubricant material for assisting machining process and forming a single layer (a layer (sheet) that can be formed in itself without the use of a supporting base material).

The high molecular weight compound (A) is not particularly limited as long as its weight average molecular weight is $5 \times 10^4$ or larger and $1 \times 10^6$ or smaller. Examples thereof include water-soluble or water-insoluble thermoplastic resins and thermosetting resins. Among them, a water-soluble thermoplastic resin or a water-insoluble thermoplastic resin is preferred, and a water-soluble thermoplastic resin is more preferred. Examples of the water-soluble or water-insoluble thermoplastic resin include, but are not particularly limited to, water-soluble resins and water-insoluble resins described below. The "water-soluble resin" refers to a high-molecular compound that is dissolved in an amount of 1 g or larger in 100 g of water at 25° C. at 1 atm. The high molecular weight compound (A) may be used alone or in combination of two or more thereof.

Use of the water-soluble resin tends to improve scrap-eliminating properties at the time of machining work owing to the lubricity of the water-soluble resin. Also, use of the water-soluble resin moderately softens the surface hardness of the lubricant material for assisting machining process and therefore tends to be able to further reduce load on a machining tool. Furthermore, a resin component attached to the machining work site can be easily removed after the machining work.

Examples of the water-soluble resin include, but are not particularly limited to: polyalkylene oxide such as polyethylene oxide, polypropylene oxide, and polyethylene oxide-propylene oxide copolymers; polyalkylene glycol such as polyethylene glycol and polypropylene glycol; ester compounds of polyalkylene glycol; ether compounds of polyalkylene glycol; water-soluble urethane; polyether-based water-soluble resins; water-soluble polyester; sodium poly(meth)acrylate; polyacrylamide; polyvinylpyrrolidone; polyvinyl alcohol; ether compounds of cellulose, such as ethylcellulose, hydroxyethylcellulose, and carboxymethylcellulose; ester compounds of cellulose, such as cellulose acetate and cellulose propionate; and modified polyamide. Among them, polyethylene oxide, polyethylene glycol, or a polyether-based water-soluble resin is preferred from the viewpoint described above.

Use of the water-insoluble resin tends to increase the surface hardness of the lubricant material for assisting machining process as compared with use of the water-soluble resin. This improves, for example, the biting properties of a machining tool at the time of machining work, can form a machining portion at a position as designed, furthermore, improves the rigidity of the lubricant material for assisting machining process, and improves handleability.

Examples of the water-insoluble resin include, but are not particularly limited to: urethane-based polymers; acrylic-based polymers; vinyl acetate-based polymers; vinyl chloride-based polymers; polyester-based polymers; polyolefin-based polymers such as polyethylene wax; polystyrene-based resins exemplified by styrene homopolymers (GPPS), styrene-butadiene copolymers (HIPS), and styrene-(meth)acrylic acid copolymers (e.g., MS resin); and copolymers thereof.

The weight average molecular weight of the high molecular weight compound (A) is $5 \times 10^4$ or larger, preferably $6 \times 10^4$ or larger, more preferably $1 \times 10^5$ or larger, further preferably $1.25 \times 10^5$ or larger. The weight average molecular weight of the high molecular weight compound (A) is $1 \times 10^6$ or smaller, preferably $8 \times 10^5$ or smaller, more preferably $7 \times 10^5$ or smaller, further preferably $6 \times 10^5$ or smaller. When the weight average molecular weight of the high molecular weight compound (A) is $5 \times 10^4$ or larger, the moldability is further improved. When the weight average molecular weight of the high molecular weight compound (A) is $1 \times 10^6$ or smaller, the lubricity is further improved. In the case of using two or more high molecular weight compounds (A), it is preferred that each of the compounds should satisfy the weight average molecular weight described above. In the present embodiment, the weight average molecular weight can be measured by a method described in Examples (the same holds true for the description below).

The content of the high molecular weight compound (A) in the lubricant material for assisting machining process is preferably 10 parts by mass or more, more preferably 20 parts by mass or more, further preferably 25 parts by mass or more, particularly preferably 30 parts by mass or more, based on 100 parts by mass in total of the high molecular weight compound (A), the medium molecular weight compound (B), and the carbon (C). The content of the high molecular weight compound (A) in the lubricant material for assisting machining process is preferably 60 parts by mass or less, more preferably 55 parts by mass or less, further preferably 50 parts by mass or less, based on 100 parts by mass in total of the high molecular weight compound (A), the medium molecular weight compound (B), and the carbon (C).

When the content of the high molecular weight compound (A) is 10 parts by mass or more, the lubricity tends to be further improved. When the content of the high molecular weight compound (A) is 60 parts by mass or less, the moldability tends to be further improved. When the content of the high molecular weight compound (A) falls within the range described above, there is a tendency to further reduce load on a machining tool and to further reduce burrs, chippings, uncut fiber residues, and delamination that occur at the end portion of a machining surface. Particularly, when the content of the high molecular weight compound (A) is 20 parts by mass or more, there is a tendency to further reduce burrs, chippings, uncut fiber residues, and delamination that occur on the periphery of processed holes.

(Medium Molecular Weight Compound (B))

The medium molecular weight compound (B) can function as a lubricant and is capable of exerting effects of improving the lubricity of the lubricant material for assisting machining process and reducing burrs, chippings, uncut fiber residues, and delamination that occur at the end portion of a machining surface. The medium molecular weight compound (B) is not particularly limited as long as its weight average molecular weight is $1 \times 10^3$ or larger and $2 \times 10^4$ or smaller. Examples thereof include water-soluble or water-insoluble thermoplastic resins and thermosetting resins. Among them, a water-soluble or water-insoluble thermoplastic resin is preferred, and a water-soluble thermoplastic resin is more preferred.

Examples of the medium molecular weight compound (B) which is a water-soluble thermoplastic resin include, but are not particularly limited to: polyalkylene glycol such as polyethylene glycol, polypropylene glycol, and polytetramethylene glycol; monoether compounds of polyalkylene oxide, such as polyethylene oxide oleyl ether, polyethylene oxide cetyl ether, polyethylene oxide stearyl ether, polyethylene oxide lauryl ether, polyethylene oxide nonyl phenyl ether, and polyethylene oxide octyl phenyl ether; monostearate compounds of polyalkylene oxide, such as polyethylene oxide monostearate, polyethylene oxide sorbitan monostearate, and polyglycerin monostearate; and polyalkylene oxide such as polyethylene oxide, polypropylene oxide, and polyethylene oxide-propylene oxide copolymers. Among them, polyethylene oxide monostearate is preferred. Use of such a medium molecular weight compound (B) tends to further improve the lubricity. The medium molecular weight compound (B) may be used alone or in combination of two or more thereof.

The weight average molecular weight of the medium molecular weight compound (B) is $1 \times 10^3$ or larger, preferably $1.25 \times 10^3$ or larger, more preferably $1.5 \times 10^3$ or larger, further preferably $2 \times 10^3$ or larger, still further preferably $2.5 \times 10^3$ or larger, particularly preferably $3 \times 10^3$ or larger. The weight average molecular weight of the medium molecular weight compound (B) is $2 \times 10^4$ or smaller, preferably $1.5 \times 10^4$ or smaller, more preferably $1.25 \times 10^4$ or smaller, further preferably $1 \times 10^4$ or smaller, still further preferably $7.5 \times 10^3$ or smaller, particularly preferably $5 \times 10^3$ or smaller. When the weight average molecular weight of the medium molecular weight compound (B) is $1 \times 10^3$ or larger, the moldability is further improved. When the weight average molecular weight of the medium molecular weight compound (B) is $2 \times 10^4$ or smaller, the lubricity is further improved.

The content of the medium molecular weight compound (B) in the lubricant material for assisting machining process is preferably 10 parts by mass or more, more preferably 15 parts by mass or more, further preferably 20 parts by mass or more, based on 100 parts by mass in total of the high molecular weight compound (A), the medium molecular weight compound (B), and the carbon (C). The content of the medium molecular weight compound (B) in the lubricant material for assisting machining process is preferably 75 parts by mass or less, more preferably 60 parts by mass or less, further preferably 45 parts by mass or less, still further preferably 40 parts by mass or less, based on 100 parts by mass in total of the high molecular weight compound (A), the medium molecular weight compound (B), and the carbon (C).

When the content of the medium molecular weight compound (B) is 10 parts by mass or more, the lubricity tends to be further improved. When the content of the medium molecular weight compound (B) is 75 parts by mass or less, the moldability tends to be further improved. When the content of the medium molecular weight compound (B) falls within the range described above, there is a tendency to further reduce load on a machining tool and to further reduce burrs, chippings, uncut fiber residues, and delamination that occur at the end portion of a machining surface.

Combined use of the high molecular weight compound (A) and the medium molecular weight compound (B) which differ in molecular weight tends to further reduce load on a machining tool and to further reduce burrs, chippings, uncut fiber residues, and delamination that occur at the end portion of a machining surface.

(Carbon (C))

The carbon (C) can function as a solid lubricant and is capable of exerting effects of improving the lubricity of the lubricant material for assisting machining process and prolonging the lifespan of a machining tool in processing. Furthermore, the carbon (C) exists in a solid state having a volume at the temperature of machining work and can therefore maintain the lubricity at the time of machining work. Examples of the carbon (C) include, but are not particularly limited to, natural graphite, artificial graphite, colloidal graphite, pyrolytic graphite, expanded graphite, and flake graphite. Among them, a flake shape is preferred. The carbon (C) having flake graphite tends to further improve abrasion-reducing performance. The carbon (C) may be used alone or in combination of two or more thereof.

In machining work, particularly, continuous machining work, using the lubricant material for assisting machining process, the carbon (C) is attached to the surface or groove of a machining tool and the internal side face of a machining portion in a workpiece material to thereby exhibit lubricity. In this respect, the carbon (C) less varies in volume and hardness due to change in temperature, as compared with the high molecular weight compound (A) and the medium molecular weight compound (B), and can therefore keep constant volume and hardness in machining work even if the temperature of the machining tool or a processing site is elevated. Specifically, the carbon (C) can reside, for example, between the machining tool and the workpiece material in machining work to thereby enhance lubricity and exhibit effects similar to those of bearings. Therefore, the carbon (C) is effective for suppressing the abrasion of the machining tool. The carbon (C) has moderately high hardness as compared with other solid lubricants, and is therefore excellent in the bearing effects described above and excellent in lubricity. As a result, there is a tendency to further reduce load on a machining tool and to further reduce burrs, chippings, uncut fiber residues, and delamination that occur at the end portion of a machining surface.

The average particle size of the carbon (C) is preferably 50 µm or larger, more preferably 100 µm or larger, further preferably 150 µm or larger, particularly preferably 200 µm or larger. The average particle size of the carbon (C) is preferably 1000 µm or smaller, more preferably 750 µm or smaller, further preferably 500 µm or smaller, particularly preferably 300 µm or smaller. When the average particle size of the carbon (C) is 50 µm or larger, the lubricity and the moldability are further improved. As a result, there is a tendency to further reduce load on a machining tool, to prolong the lifespan of the machining tool, and to further reduce burrs, chippings, uncut fiber residues, and delamination that occur at the end portion of a machining surface.

When the average particle size of the carbon (C) is 100 µm or larger, the lubricity and the moldability are further improved. As a result, there is a tendency to further prolong the lifespan of a drill and to further reduce burrs, chippings, uncut fiber residues, and delamination that occur on the periphery of processed holes. When the average particle size of the carbon (C) is 1000 µm or smaller, the abrasion of a machining tool tends to be further suppressed. In the case of comprising two or more carbons (C), their respective average particle sizes can satisfy the range described above.

The content of the carbon (C) in the lubricant material for assisting machining process is preferably 5 parts by mass or more, more preferably 15 parts by mass or more, further preferably 20 parts by mass or more, particularly preferably 25 parts by mass or more, based on 100 parts by mass in total of the high molecular weight compound (A), the medium molecular weight compound (B), and the carbon (C). The content of the carbon (C) in the lubricant material for assisting machining process is preferably 70 parts by mass or less, more preferably 65 parts by mass or less, further preferably 60 parts by mass or less, based on 100 parts by mass in total of the high molecular weight compound (A), the medium molecular weight compound (B), and the carbon (C). When the content of the carbon (C) is 5 parts by mass or more, the lubricity tends to be further improved.

When the content of the carbon (C) is 70 parts by mass or less, the moldability tends to be further improved. When the content of the carbon (C) falls within the range described above, there is a tendency to further reduce load on a machining tool and to further reduce burrs, chippings, uncut fiber residues, and delamination that occur at the end portion of a machining surface.

(Additional Component)

The lubricant material for assisting machining process may optionally contain an additional component. Examples of the additional component include lubricity-improving components, formability-improving components, plasticizers, softening agents, surface conditioners, leveling agents, antistatic agents, emulsifiers, antifoaming agents, wax additives, coupling agents, rheology-controlling agents, antiseptics, antifungal agents, antioxidants (e.g., hydroquinone), light stabilizers, nucleating agents (e.g., succinic acid), organic fillers, inorganic fillers, solid lubricants, heat stabilizers, and colorants.

Examples of the lubricity-improving component include, but are not particularly limited to: amide compounds exemplified by ethylenebisstearamide, oleic acid amide, stearic acid amide, and methylenebisstearamide; fatty acid compounds exemplified by lauric acid, stearic acid, palmitic acid, and oleic acid; fatty acid ester compounds typified by butyl stearate, butyl oleate, and glycol laurate; aliphatic hydrocarbon compounds typified by liquid paraffin; and higher aliphatic alcohols typified by oleyl alcohol. At least one of these lubricity-improving components can be selected.

Examples of the formability-improving component include, but are not particularly limited to, epoxy resins, phenol resins, cyanate resins, melamine resins, urea resins, and thermosetting polyimide, which are thermosetting resins. At least one of these formability-improving components can be selected.

When the lubricant material for assisting machining process is placed on the curved surface of a workpiece material (e.g., CFRP), a plasticizer or a softening agent contained in the lubricant material for assisting machining process can suppress cracks in the lubricant material for assisting machining process, for example, by mitigating stress or strain to the lubricant material for assisting machining process, and tends to further improve the curved surface following properties. Examples of the plasticizer or the softening agent include, but are not particularly limited to, phthalic acid ester, adipic acid ester, trimellitic acid ester, polyester, phosphoric acid ester, citric acid ester, epoxidized plant oil, and sebacic acid ester.

Examples of the solid lubricant other than the fullerene and the carbon (C) include, but are not particularly limited to, molybdenum disulfide, tungsten disulfide, molybdenum compounds, polytetrafluoroethylene, and polyimide.

[Lubricant Sheet for Assisting Machining Process]

The lubricant sheet for assisting machining process of the present embodiment is not particularly limited as long as the lubricant sheet for assisting machining process is at least partially provided with a layer made of the lubricant material for assisting machining process. Examples thereof include a single layer of the lubricant material for assisting machining process molded into a sheet, and a laminate of the lubricant material for assisting machining process molded into a sheet, and an additional layer.

(Adhesive Layer)

The lubricant sheet for assisting machining process may have an adhesive layer as the additional layer on a surface to be brought into contact with a workpiece material. The presence of the adhesive layer tends to further improve the adhesion between the lubricant material for assisting machining process and the workpiece material.

Examples of the component constituting the adhesive layer include, but are not particularly limited to, thermoplastic resins and thermosetting resins. Examples of the thermoplastic resin include, but are not particularly limited to, urethane-based polymers, acrylic-based polymers, vinyl acetate-based polymers, vinyl chloride-based polymers, polyester-based polymers, and copolymers thereof. Examples of the thermosetting resin include, but are not particularly limited to, resins such as phenol resins, epoxy resins, melamine resins, urea resins, unsaturated polyester resins, alkyd resins, polyurethane, thermosetting polyimide, and cyanate resins. Among them, an acrylic-based polymer is preferred because it is required to have the properties of leaving no paste on a workpiece material (e.g., CFRP) and being capable of easily adhering at ordinary temperature. A solvent-type acrylic pressure-sensitive adhesive and an acrylic emulsion-type pressure sensitive adhesive (aqueous) are more preferred.

The adhesive layer may optionally contain a degradation-preventing agent such as an antioxidant, and an inorganic filler such as calcium carbonate, talc, or silica, as other components of the adhesive layer.

When the lubricant material for assisting machining process is removed from a workpiece material after machining work, the amount of a component of the lubricant material for assisting machining process and/or the adhesive layer attached to the workpiece material is preferably $1.0 \times 10^{-8}$ g or smaller, more preferably $5.0 \times 10^{-9}$ g or smaller, per $mm^2$ of the areas of the contact portion between the workpiece material and the lubricant material for assisting machining process, and the processed portion. The lower limit of the amount of a component of the lubricant material for assisting machining process and/or the adhesive layer attached to the workpiece material is not particularly limited and is preferably 0. In this context, the processed portion refers to the inside of a processed hole, for example, in the case of drilling work with a drill.

(Thickness)

The thickness of the lubricant material for assisting machining process excluding the adhesive layer is not particularly limited and is appropriately selected according to a machining method for the machining work of a workpiece material, a cut off method, the area or volume of a portion subjected to the machining work, the size of a machining tool for use in the machining work, the configuration or thickness of a fiber-reinforced plastic (CFRP), etc. Among others, the thickness of the layer made of the lubricant material for assisting machining process in the lubricant sheet for assisting machining process is preferably 0.1 mm or larger, more preferably 0.2 mm or larger, further preferably 0.5 mm or larger. The thickness of the layer made of the lubricant material for assisting machining process is preferably 20 mm or smaller, more preferably 10 mm or smaller, further preferably 5 mm or smaller. When the thickness of the layer made of the lubricant material for assisting machining process is 0.1 mm or larger, sufficient reduction in machining stress tends to be obtained. When the thickness of the layer made of the lubricant material for assisting machining process is 20 mm or smaller, there is a tendency to reduce the twining of the lubricant material for assisting machining process around a machining tool in machining work and to be able to further suppress the occurrence of cracks in the lubricant material for assisting machining process.

Furthermore, the resin contained in the lubricant material for assisting machining process can be prevented from serving as a binder for machining chippings. There is a tendency to be able to prevent machining chippings from remaining in a machining portion. This tends to be able to suppress increase in the inside irregularity of the machining portion. In short, the lubricity can be improved by securing the proper composition and thickness of the lubricant material for assisting machining process. The elimination of machining chippings through the groove of a machining tool can be optimized for machining work. For further obtaining the effects of the present invention, it is preferred to appropriately control the total thickness of the lubricant material for assisting machining process within the range mentioned above. A plurality of thin lubricant material for assisting machining process may be layered for use.

The thickness of the adhesive layer is not particularly limited and is preferably 0.01 mm or larger, more preferably 0.05 mm or larger. The thickness of the adhesive layer is preferably 5 mm or smaller, more preferably 2.5 mm or smaller.

The thickness of each layer constituting the lubricant material for assisting machining process is measured as follows. First, the lubricant material for assisting machining process is cut off in a direction perpendicular to the lubricant material for assisting machining process using a cross-section polisher (CROSS-SECTION POLISHER SM-09010 manufactured by JEOL Ltd. DATUM Solution Business Operations) or an ultramicrotome (EM UC7 manufactured by Leica Camera AG). Next, the plane of section is observed in a direction perpendicular to the plane of section using a scanning electron microscope (SEM) (VE-7800 manufactured by Keyence Corp.) to measure the thickness of each layer constituting the lubricant material for assisting machining process. In this operation, the thicknesses of 5 sites per field of view are measured, and an average value thereof is used as the thickness of each layer.

(Method for Producing Lubricant Material for Assisting Machining Process)

The method for producing the lubricant material for assisting machining process is not particularly limited, and a conventional method known in the art for molding a resin composition comprising a resin such as a polymeric material, and a filler (e.g., an inorganic filler) into a sheet or a block form such as a round bar shape or a square bar shape can be widely used. Examples thereof include: a method which involves mixing the fullerene, the high molecular weight compound (A), the medium molecular weight compound (B), and the carbon (C) in the presence or absence of a solvent, applying the mixture to a support, solidifying the mixture by cooling to form a sheet, and then peeling off the support therefrom to obtain the lubricant material for assisting machining process; and a method which involves mixing the fullerene, the high molecular weight compound (A), the medium molecular weight compound (B), and the carbon (C) in the presence or absence of a solvent, extrusion-molding the mixture into a sheet shape, and drawing the sheet, if necessary, to obtain the lubricant material for assisting machining process.

When the lubricant material for assisting machining process is the laminate mentioned above (e.g., a lubricant sheet for assisting machining process having an adhesive layer and/or a protective layer), examples of the method for producing the laminate include, but are not particularly limited to: a method which involves preparing one layer in advance and directly forming another layer on at least one side thereof; and a method which involves laminating one layer prepared in advance and another layer by a lamination method using an adhesive resin or heat.

The method for forming an adhesive layer on the surface of the lubricant material for assisting machining process is not particularly limited as long as the method is known in the art and industrially used. Specific examples thereof include: a method which involves forming the adhesive layer by a roll method, a curtain coating method, a spraying method, or the like; and a method which involves forming in advance the adhesive layer having the desired thickness using a roll, a T-die extruder, or the like. The thickness of the adhesive layer is not particularly limited, and the optimum thickness can be appropriately selected according to the curvature of a workpiece material and the configuration of the lubricant material for assisting machining process.

In the case of producing the lubricant material for assisting machining process in a melted state, examples of the method therefor include: a method using, as the lubricant material for assisting machining process, a resin composition obtained by mixing a resin and a filler; and a method using, as the lubricant material for assisting machining process, a resin composition obtained by mixing a resin, a filler, and a solvent.

(Workpiece Material)

The workpiece material is not particularly limited as long as the workpiece material comprises a metal, a fiber-reinforced plastic, ceramic, or any of composite materials comprising these members. Examples of the metal include iron, aluminum, and titanium as well as alloys such as titanium alloy, aluminum alloy, superalloy, stainless steel (SUS), duralumin, carbon steel, and tool steel. The fiber-reinforced plastic is not particularly limited as long as the composite material is constituted by a matrix resin and a reinforcing fiber. Examples of the matrix resin include, but are not particularly limited to: thermosetting resins such as epoxy resins, phenol resins, cyanate resins, vinyl ester resins, and unsaturated polyester resins; and thermoplastic resins such as ABS (acrylonitrile-butadiene-styrene) resins, PA (polyamide) resins, PP (polypropylene) resins, PC (polycarbonate) resins, methyl methacrylate resins, polyethylene, and acryl, and polyester resins. Examples of the reinforcing fiber include, but are not particularly limited to, glass fiber, carbon fiber, and aramid fiber. Examples of the form of the reinforcing fiber include, but are not particularly limited to, filaments, tows, cloths, blades, chops, milled fibers, felt mats, papers, and prepregs. Specific examples of such a fiber-reinforced plastic include, but are not particularly limited to, fiber-reinforced plastics (FRP) such as carbon fiber-reinforced plastic (CFRP), glass fiber-reinforced plastic (GFRP), and aramide fiber-reinforced plastic (AFRP). Among them, carbon fiber-reinforced plastic (CFRP) relatively having large tensile strength and tensile elastic force and small density is preferred. The fiber-reinforced plastic may optionally contain an additional component such as an inorganic filler or an organic filler. Examples of the ceramic include, but are not particularly limited to, hard oxides such as alumina, quartz, and zirconia as well as carbides such as silicon carbide, and nitrides such as silicon nitride and gallium nitride. Examples of the form of the ceramic include, but are not particularly limited to, monocrystals, polycrystals, and sintered powders.

(Method for Transferring Lubricating Material to Tool Edge)

The method for transferring the lubricant material for assisting machining process of the present embodiment to a tool edge is not particularly limited and is most preferably a method which involves allowing the lubricant material for assisting machining process in a sheet shape provided with an adhesive layer to adhere to a machining work site of a workpiece material, and performing the machining work of the workpiece material together with the sheet. In the present specification, the adhesive layer is defined as a layer of a compound having adhesiveness for use in fixing the workpiece material and the lubricant material for assisting machining process. However, depending on the type of a tool or machining or the shape of a workpiece material, a more preferred method may involve machining in advance the lubricant material for assisting machining process in a block shape with a tool for use in processing to transfer the lubricant material for assisting machining process to the tool edge, and machining the workpiece material, or may involve applying or spraying the lubricant material for assisting machining process in a liquid state to a machining work site of the workpiece material, for example.

[Machining Method]

The machining method of the present embodiment is not particularly limited as long as the machining method comprises a machining step of machining a workpiece material with a machining tool while bringing the lubricant material for assisting machining process into contact with the machining tool and/or a to-be-processed portion of the workpiece material. The machining method includes, for example, drilling work in which, in the machining step, a through-hole is formed by machining using a drill as the machining tool. Among others, the form of the machining work for which the lubricant material for assisting machining process of the present embodiment is more effective is drilling work. However, the scope of application is not limited thereto in light of the mechanism of action of the lubricating material. The lubricant material for assisting machining process of the present embodiment exhibits improved transfer to a tool edge and is therefore particularly effective for deep through-hole drilling work which is limited by lubricating material supply to a tool edge and tends to have poor processing quality at the tool exit side.

The drilling work described in the present specification includes, but is not limited to, through-hole drilling work with a drill as well as blind hole processing with an end mill, expanded hole processing including slotted hole processing, swaged hole processing, threading work with a tap, and combinations thereof, and means processing to cut in the workpiece material perpendicularly to the direction of tool rotation. The lubricant material for assisting machining process of the present embodiment can be used without distinction in crude processing such as prepared hole drilling and finishing work using a reamer, boring, or the like. The lubricant material for assisting machining process of the present embodiment can also be used in multiple-stage drilling work which involves performing drilling with a large-diameter tool after drilling with a small-diameter tool or performing deep drilling work after guide drilling work. These processes may be combined with a processing option known in the art such as step drilling which promotes scrap elimination, center through air, mist application, or air blowing to thereby produce higher processing quality. The machine tool can be appropriately selected according to the quality and shape of the workpiece material and the shape of a processed hole from a hand drill, a drill press, a milling machine, an NC lathe, a machining center, a 5-axis machine, and the like, and used alone or in combination.

The machining work other than drilling work described in the present specification is not particularly limited as long as the machining work employs a machining tool. Examples thereof include milling work with an end mill, a router, or the like, flat surface milling work with a face mill, a plain milling cutter, an end mill, or the like, and cut off work using a circular saw, a grind stone, an end mill, or the like, polishing work using a polishing grind stone, curved surface processing using a radius end mill, a ball end mill, or the like, and turning with a turning tool. The lubricant material for assisting machining process of the present embodiment can also be used without distinction in crude processing, finishing work, and multiple-stage processing in the machining work other than drilling work. These processes may be combined with a processing option known in the art such as step drilling which promotes scrap elimination, center through air, mist application, or air blowing to thereby produce higher processing quality. The machine tool can be appropriately selected according to the quality and shape of the workpiece material and the shape of a processed hole from a hand drill, a drill press, a milling machine, an NC lathe, a machining center, a 5-axis machine, a circular saw, a grind stone, a grinding machine, and the like, and used alone or in combination.

(Machining Tool)

The machining tool is not particularly limited and is appropriately selected according to the material and shape of the workpiece material, a processing shape, and the type of the machine tool. High-speed steel, cemented carbide, polycrystalline cubic boron nitride, or the like is used as a matrix of the tool. The lubricant material for assisting machining process of the present embodiment is effective for both noncoated tools and various coated tools used as the machining tool. Examples of the type of the coating of the tool include diamond coat, titanium nitrite coat, diamond-like carbon coat, and ceramic coat.

EXAMPLES

Hereinafter, the present invention will be specifically described with reference to Examples and Comparative Examples. Examples described below are given merely for illustrating the exemplary embodiments of the present invention, and the present invention is not limited by these Examples.

Example 1: Preparation of Lubricant Sheet for Assisting Machining Process 2000 parts by mass of $C_{60}$-containing mixed fullerene (nanom mix ST, manufactured by Frontier Carbon Corp., secondary average particle size=100 μm) as the fullerene, 1500 parts by mass of polyethylene oxide (Alkox E-45, manufactured by Meisei Chemical Works, Ltd., weight average molecular weight=$5.6 \times 10^5$) and 2500 parts by mass of a polyethylene oxide-polypropylene oxide copolymer (Alkox EP-1010N, manufactured by Meisei Chemical Works, Ltd., weight average molecular weight=$1.0 \times 10^5$) as the high molecular weight compound (A), 2500 parts by mass of polyethylene oxide monostearate (Nonion S-40 manufactured by NOF Corp., weight average molecular weight=$3.5 \times 10^3$) as the medium molecular weight compound (B), 3500 parts by mass of graphite (XD100, Ito Graphite Co., Ltd., average particle size=250 μm, flake shape) as the carbon (C), 150 parts by mass of succinic acid as a nucleating agent, and 30 parts by mass of hydroquinone as an antioxidant were molded at a temperature of 140° C. using a single-screw extruder to prepare a sheet having a thickness of 1.0 mm and a size of 80 mm×280 mm. The strongly adhesive face of double-faced tape having a thickness of 0.12 mm (No. 535A, manufactured by Nitto Denko Corp.) was affixed to one side of this sheet to prepare a lubricant sheet for assisting machining process.

In order to determine the average particle sizes (median sizes) of the fullerene and the carbon (C), carbon particles were dispersed in a solution containing a hexametaphosphoric acid solution and a few drops of triton, and the respective maximum lengths of projected carbon particles were measured using a laser diffraction particle size distribution analyzer. Then, the cumulative distribution curve (number-based) of particle sizes was calculated. A particle diameter that became 50% height in the cumulative distribution curve (number-based) was used as the average particle size.

The weight average molecular weights of the high molecular weight compound (A) and the medium molecular weight compound (B) were calculated as relative average molecular weights by dissolving or dispersing each of the high molecular weight compound (A) and the medium molecular weight compound (B) in a 0.05% salt solution, followed by measurement by liquid chromatography involving GPC (gel permeation chromatography) columns with polyethylene glycol as standards.

(Drilling Work of Titanium Alloy)

The prepared lubricant sheet for assisting machining process was affixed to the whole surface on one side of a workpiece material titanium alloy plate (Ti-6Al-4V) having a size of 280 mm wide×80 mm deep and a thickness of 20 mm. Subsequently, the titanium alloy plate was fixed, with the lubricant sheet for assisting machining process-affixed side facing up, to a machine vise equipped with a machining center (vertical machining center "VCN-535C" manufactured by Yamazaki Mazak Corp.) by holding the titanium alloy plate from the front and the rear such that the lower side (drill exit side) of the titanium alloy plate became free. Subsequently, coated carbide drill having a diameter of 6 mmϕ (carbide SUS drill "ADO-SUS 3D 6" manufactured by OSG Corp.) was held in a tool holder, and 25 through-holes were continuously formed with air brown toward the machining point from above obliquely by 45 degrees under machining conditions involving a circumferential velocity of 20 m/min, and a feed per revolution of 0.10 mm/rev (a feed per revolution of 0.020 mm/rev in the range of hole depths from 18 to 20 mm).

(Measurement of Back Burr Height on Titanium Alloy)

A burr height on the drill exit side of the titanium alloy plate after drilling was measured by the following method. The end portion on the drill exit side of the processed titanium alloy plate was photographed under an optical microscope at a magnification of 40×. Subsequently, the average surface height of the plate and the height of a protrusion (apex of a back burr) at the end portion of the processed plate were determined by image processing, and the difference therebetween was calculated as a back burr height. The number of measurement points for the back burr height was set to 8 per hole, and the average value of back burr heights at the 8 points was used as an "8 point-average back burr height". Also, the average value of the average back burr heights of the 1st, 5th, 10th, 15th, 20th and 25th holes was used as a "6 hole-average back burr height". The 6 hole-average back burr height in Example 1 was 88 μm.

Comparative Example 1

A lubricant sheet for assisting machining process was prepared in the same way as in Example 1 except that no fullerene was used. The drilling work of a titanium alloy plate and the measurement of an 8 point-average back burr height and a 6 hole-average back burr height were performed in the same way as in Example 1. The 6 hole-average back burr height in Comparative Example 1 was 97 μm.

Comparative Example 2

A lubricant sheet for assisting machining process was prepared in the same way as in Example 1 except that resin composition was as described in Table 1. The drilling work of a titanium alloy plate and the measurement of an 8 point-average back burr height and a 6 hole-average back burr height were performed in the same way as in Example 1. The 6 hole-average back burr height in Comparative Example 2 was 186 μm.

TABLE 1

| | | Example 1 | Comparative Example 1 | Comparative Example 2 |
|---|---|---|---|---|
| Fullerene [parts by mass] | Fullerene mixture | 2000 | | |
| High molecular weight compound (A) [parts by mass] | PEO (weight average molecular weight = 5.6 × 10$^5$) | 1500 | 1500 | 1000 |
| | PEO-PPO (weight average molecular weight = 1.0 × 10$^5$) | 2500 | 2500 | 2000 |
| Medium molecular weight compound (B) [parts by mass] | PEO monostearate (weight average molecular weight = 3.5 × 10$^3$) | 2500 | 2500 | 2000 |
| Carbon (C) [parts by mass] | | 3500 | 3500 | 5000 |
| Hydroquinone [parts by mass] | | 30 | 30 | 23 |
| Succinic acid [parts by mass] | | 150 | 150 | 113 |
| 8 point-average back burr height [μm] | 1st hole | 85 | 94 | 197 |
| | 5th hole | 91 | 110 | 180 |
| | 10th hole | 88 | 90 | 184 |
| | 15th hole | 91 | 117 | 196 |
| | 20th hole | 85 | 81 | 172 |
| | 25th hole | 88 | 92 | 190 |
| 6 hole-average back burr height [μm] | | 88 | 97 | 186 |

The results described above demonstrated that use of a lubricant sheet for assisting machining process supplemented with fullerene produces higher machining quality at the time of the machining work of a difficult-to-cut material.

The lubricant material for assisting machining process of the present invention improves processing quality and reduces processing cost in the machining work of a workpiece material, particularly, a difficult-to-cut material, and thus has industrial applicability.

The invention claimed is:

1. A lubricant sheet for assisting machining process comprising
the sheet being at least partially provided by a layer made of a lubricant material for assisting machining process, the lubricant material for assisting machining process comprising:
a fullerene;
a high molecular weight compound (A) having a weight average molecular weight of $5\times10^4$ or larger and $1\times10^6$ or smaller;
a medium molecular weight compound (B) having a weight average molecular weight of $1\times10^3$ or larger and $2\times10^4$ or smaller; and
a carbon (C), other than the fullerene, having an average particle size of 100 to 1000 μm.

2. The lubricant sheet for assisting machining process according to claim 1, wherein
the fullerene comprises $C_{60}$.

3. The lubricant sheet for assisting machining process according to claim 1, wherein
the high molecular weight compound (A) comprises a thermoplastic resin having the weight average molecular weight of $5\times10^4$ or larger and $1\times10^6$ or smaller, and
the medium molecular weight compound (B) comprises a thermoplastic resin having the weight average molecular weight of $1\times10^3$ or larger and $2\times10^4$ or smaller.

4. The lubricant sheet for assisting machining process according to claim 1, wherein
the high molecular weight compound (A) comprises a water-soluble thermoplastic resin and/or a water-insoluble thermoplastic resin, wherein
the water-soluble thermoplastic resin comprises one or more selected from the group consisting of polyalkylene oxide, polyalkylene glycol, an ester compound of polyalkylene glycol, an ether compound of polyalkylene glycol, water-soluble urethane, a polyether-based water-soluble resin, water-soluble polyester, sodium poly(meth)acrylate, polyacrylamide, polyvinylpyrrolidone, polyvinyl alcohol, an ether compound of cellulose, an ester compound of cellulose, and modified polyamide, and
the water-insoluble thermoplastic resin comprises one or more selected from the group consisting of a urethane-based polymer, an acrylic-based polymer, a vinyl acetate-based polymer, a vinyl chloride-based polymer, a polyester-based polymer, a polyolefin-based polymer, a polystyrene-based resin, and copolymers thereof.

5. The lubricant sheet for assisting machining process according to claim 1, wherein
the medium molecular weight compound (B) comprises a water-soluble thermoplastic resin and/or a water-insoluble thermoplastic resin, wherein
the water-soluble thermoplastic resin comprises one or more selected from the group consisting of polyalkylene glycol, a monoether compound of polyalkylene oxide, a monostearate compound of polyalkylene oxide, and a polyalkylene oxide compound.

6. The lubricant sheet for assisting machining process according to claim 1, wherein
a content of the fullerene is 0.1 to 30 parts by mass based on 100 parts by mass in total of the fullerene, the high molecular weight compound (A), the medium molecular weight compound (B), and the carbon (C).

7. The lubricant sheet for assisting machining process according to claim 1, the sheet being at least partially provided with an adhesive layer.

8. The lubricant sheet for assisting machining process according to claim 7, wherein
the adhesive layer comprises an acrylic-based polymer.

9. The lubricant sheet for assisting machining process according to claim 1, wherein
a thickness of the layer made of the lubricant material for assisting machining process is 0.1 to 20 mm.

10. A machining method comprising
a machining step of machining a workpiece material with a machining tool while bringing the lubricant sheet for assisting machining process according to claim 1 into contact with the machining tool and/or a to-be-processed portion of the workpiece material.

11. The machining method according to claim 10, wherein
in the machining step, a through-hole is formed by machining.

12. The machining method according to claim 10, wherein
the workpiece material is one or more selected from the group consisting of titanium alloy, aluminum alloy, superalloy, stainless steel, carbon fiber-reinforced plastic, aramide fiber-reinforced plastic, and composite materials comprising these.

* * * * *

UNITED STATES PATENT AND TRADEMARK OFFICE
CERTIFICATE OF CORRECTION

PATENT NO. : 11,214,748 B2
APPLICATION NO. : 16/607265
DATED : January 4, 2022
INVENTOR(S) : Shigeru Horie et al.

It is certified that error appears in the above-identified patent and that said Letters Patent is hereby corrected as shown below:

In the Claims

Column 20, Line (49):
In Claim 12, please delete "aramide" and insert -- aramid --, therefor.

Signed and Sealed this
Thirty-first Day of May, 2022

Katherine Kelly Vidal
Director of the United States Patent and Trademark Office